United States Patent
Azuma

(10) Patent No.: US 8,373,065 B2
(45) Date of Patent: Feb. 12, 2013

(54) LIGHTNING PROTECTION SYSTEM AND METHOD

(75) Inventor: Hidetaka Azuma, Toyonaka (JP)

(73) Assignees: Noboru Oshima, Nara, Nara Prefecture (JP); J.C. Jordan, Eldorado Hills, CA (US)

( * ) Notice: Subject to any disclaimer, the term of this patent is extended or adjusted under 35 U.S.C. 154(b) by 530 days.

(21) Appl. No.: 12/651,486

(22) Filed: Jan. 4, 2010

(65) Prior Publication Data

US 2011/0162863 A1 Jul. 7, 2011

(51) Int. Cl.
*H02G 13/00* (2006.01)
*A01H 5/02* (2006.01)
*H02B 1/06* (2006.01)
*H01H 1/00* (2006.01)

(52) U.S. Cl. .............. 174/3; 174/2; 174/4 R; 174/5 R; 361/117

(58) Field of Classification Search ............... 174/2, 3, 174/4 R, 5 R, 7; 361/117; 430/100
See application file for complete search history.

(56) References Cited

U.S. PATENT DOCUMENTS

| | | | | |
|---|---|---|---|---|
| 6,167,896 B1 * | 1/2001 | Smith | ............. | 135/96 |
| 6,347,672 B1 * | 2/2002 | Reardon | ............. | 173/90 |
| 6,963,026 B2 * | 11/2005 | Brennan | ............. | 174/7 |
| 6,986,673 B2 * | 1/2006 | de la Borbolla | ............. | 439/100 |
| 7,365,267 B2 * | 4/2008 | Kim | ............. | 174/3 |
| 8,050,007 B1 * | 11/2011 | DeGurski et al. | ............. | 361/117 |

FOREIGN PATENT DOCUMENTS

| | | |
|---|---|---|
| JP | 4249895 | 9/1992 |
| JP | 5121192 A | 5/1993 |
| JP | 8330093 | 12/1996 |
| JP | 11040390 A | 2/1999 |
| JP | 2005327581 A | 11/2005 |
| JP | 2006164661 | 6/2006 |
| JP | 2006209984 A | 8/2006 |

* cited by examiner

*Primary Examiner* — Zachary M Pape
*Assistant Examiner* — Binh Tran
(74) *Attorney, Agent, or Firm* — Law Offices of David M. Lang; David M. Lang

(57) ABSTRACT

An omnidirectional, external, lightning protection system which serves to minimize damage from lightning current and lightning electromagnetic impulse (LEMP). Embodiments of the present invention disclose a variety of individual structural components which may be rapidly assembled to form an air termination system, down conductor system, and earth termination system, according to established standards of lightning protection. The apparatus may be erected to protect a structure, area, or equipment and dismantled to its components parts when no longer required. The assembled structure may serve as a temporary or permanent protective structure.

7 Claims, 21 Drawing Sheets

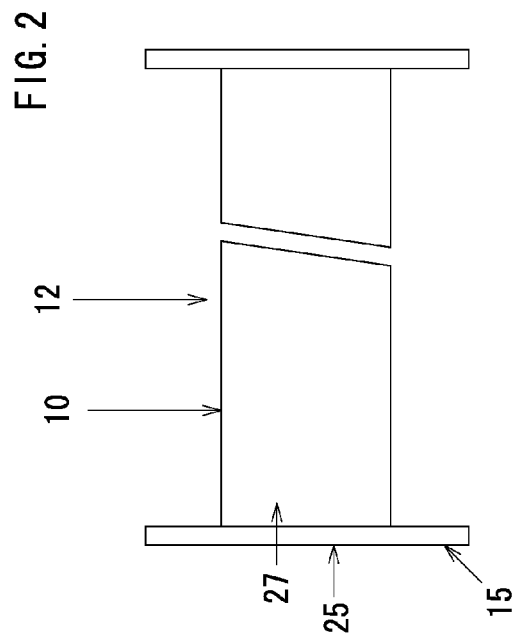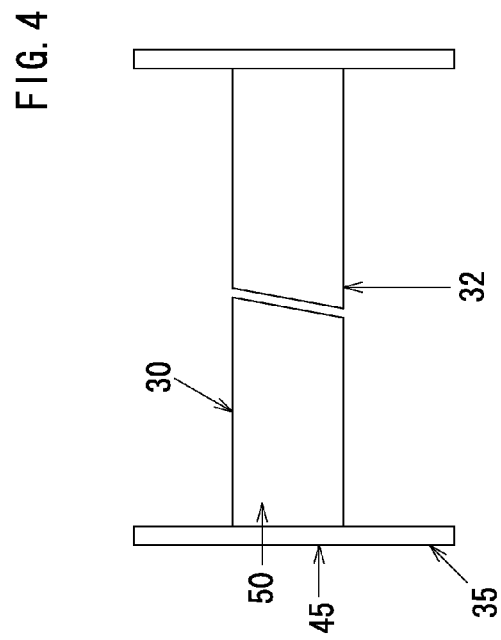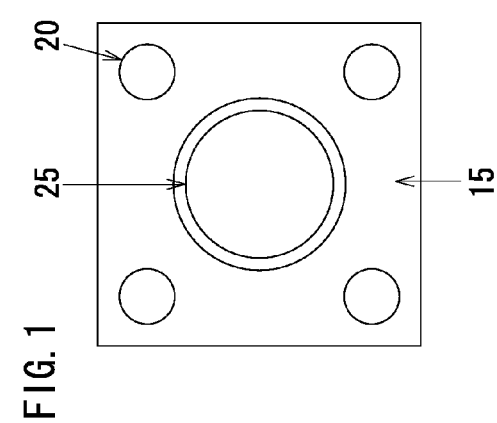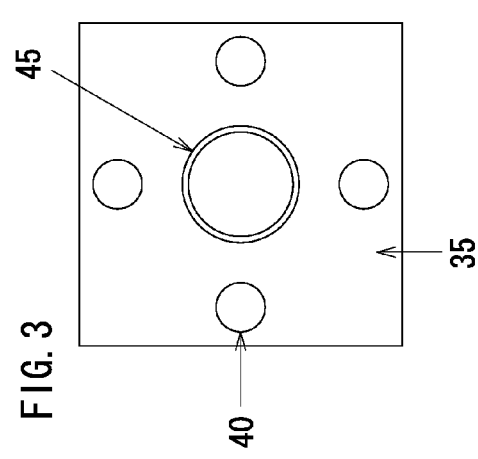

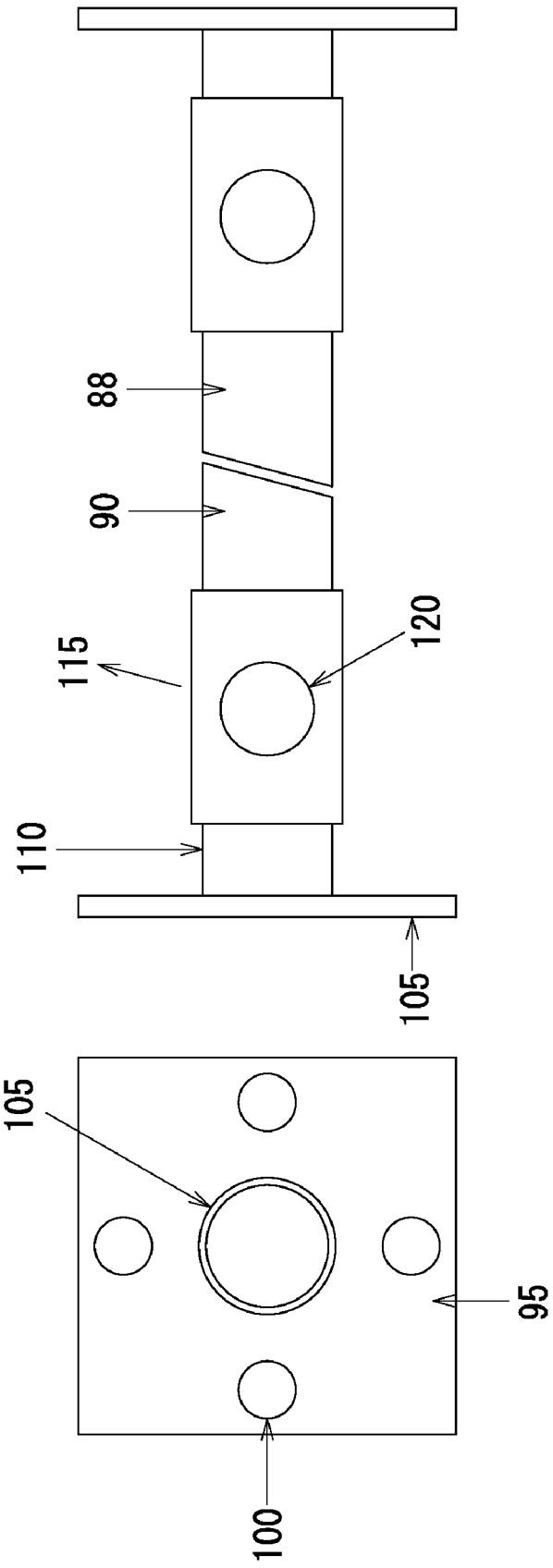

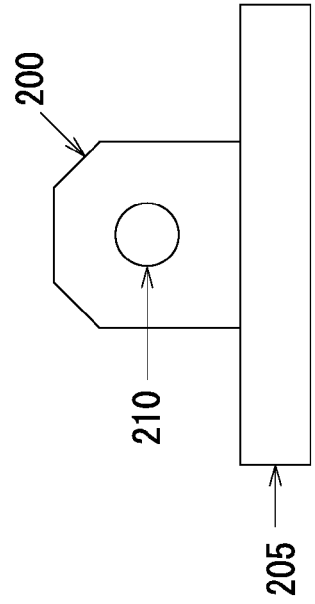
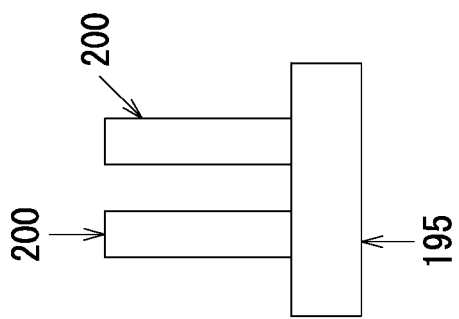
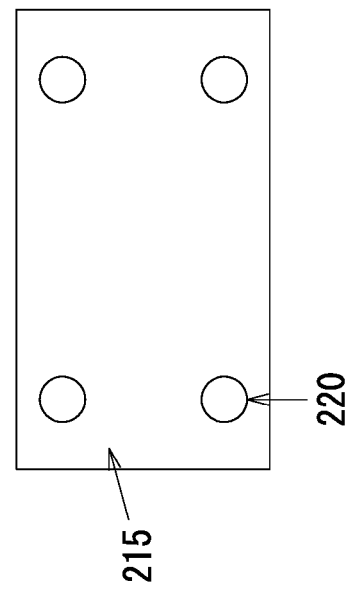

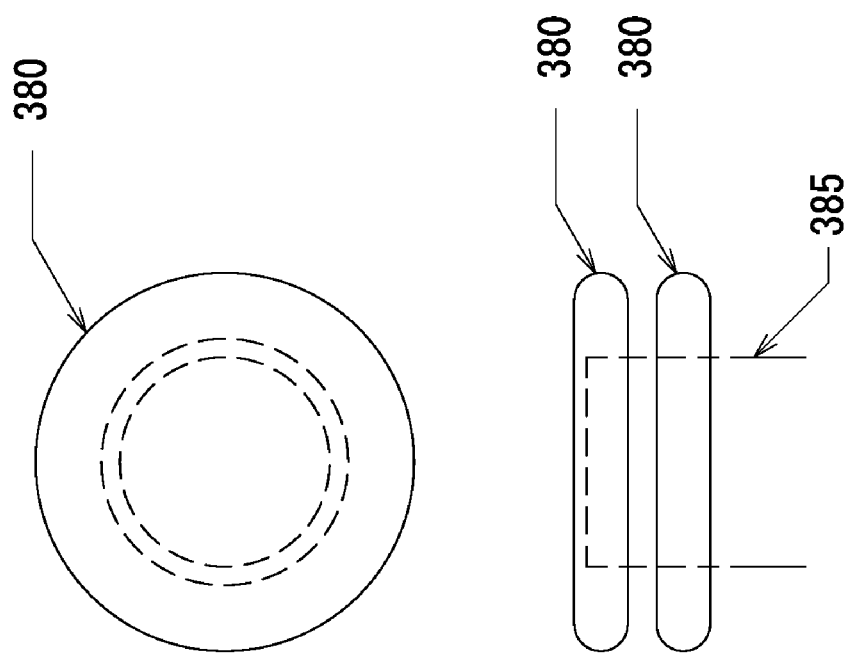

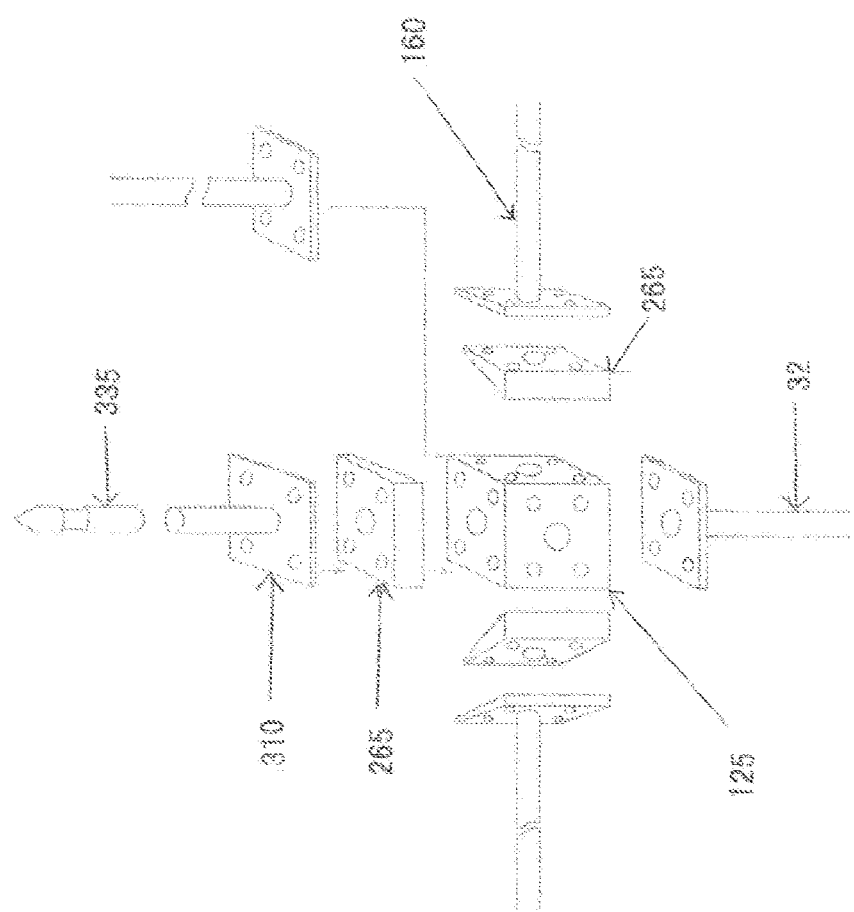

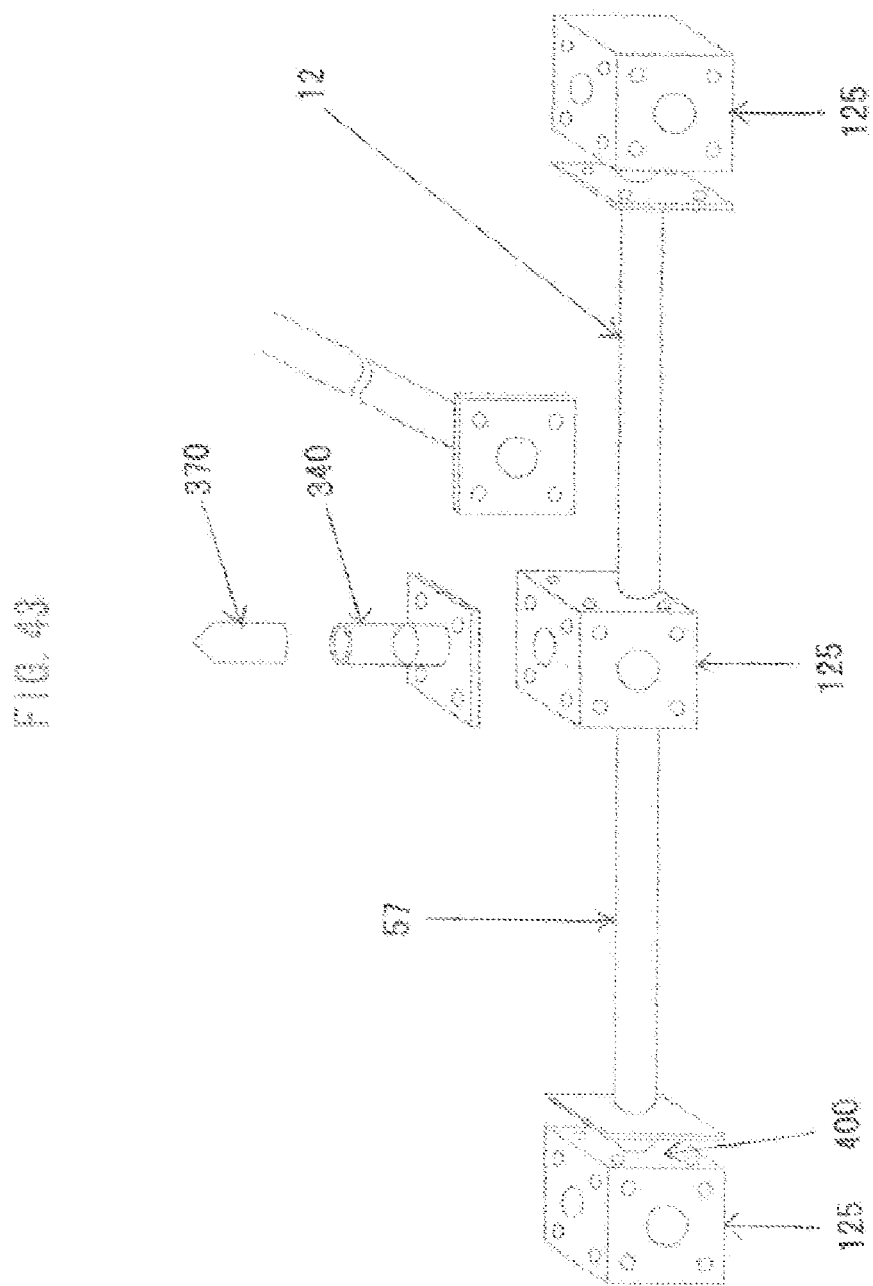

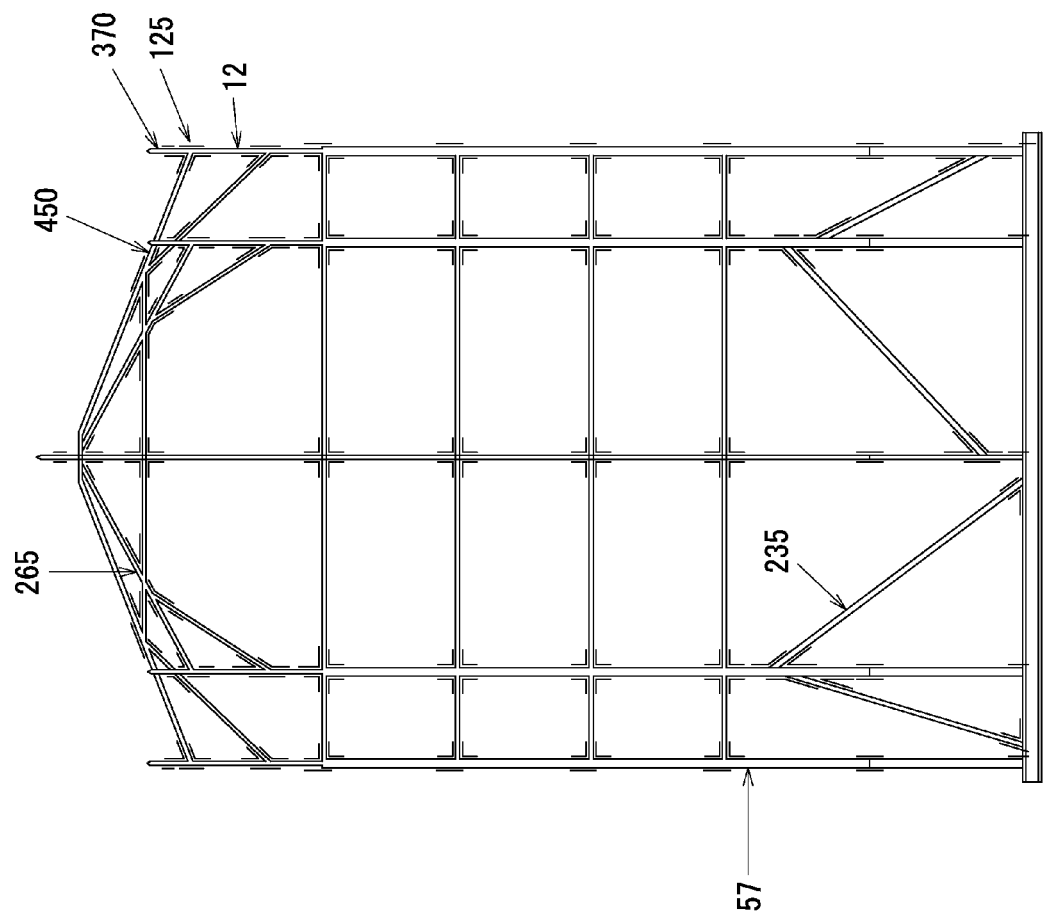

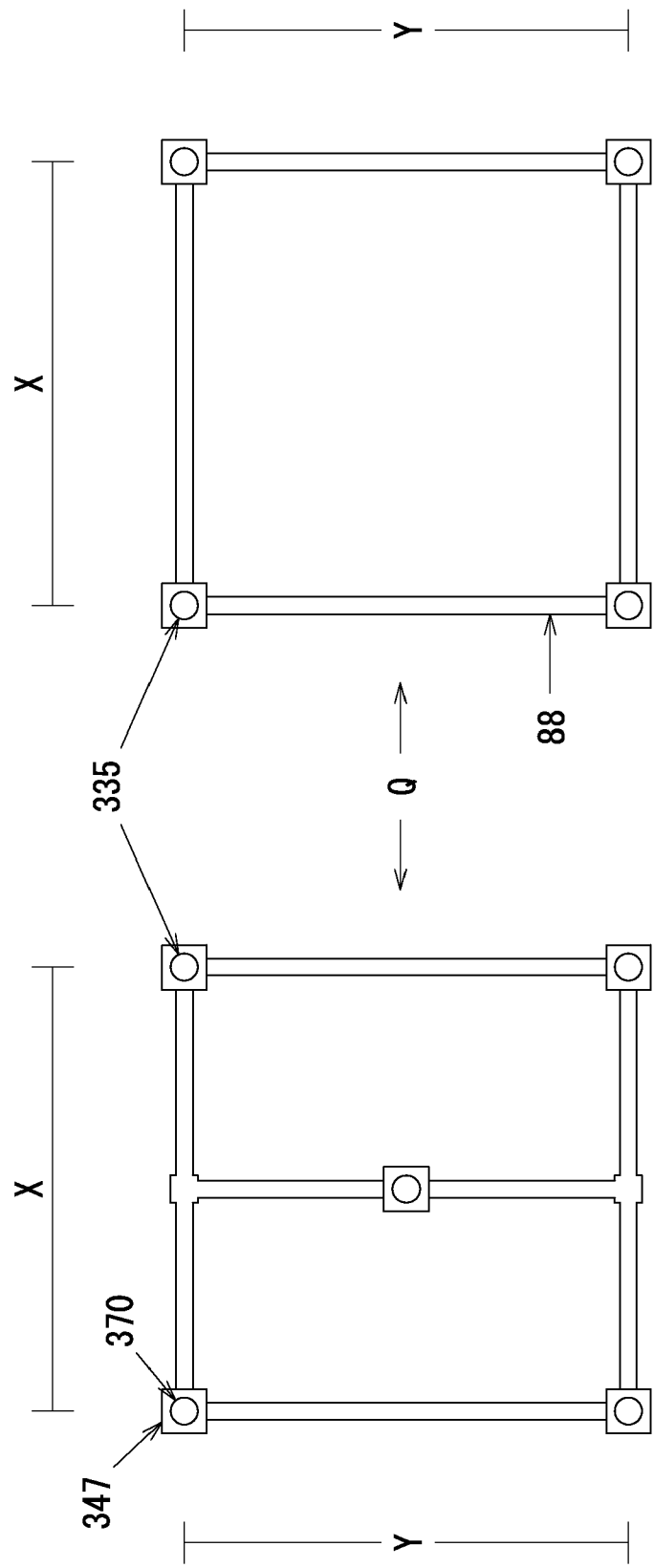

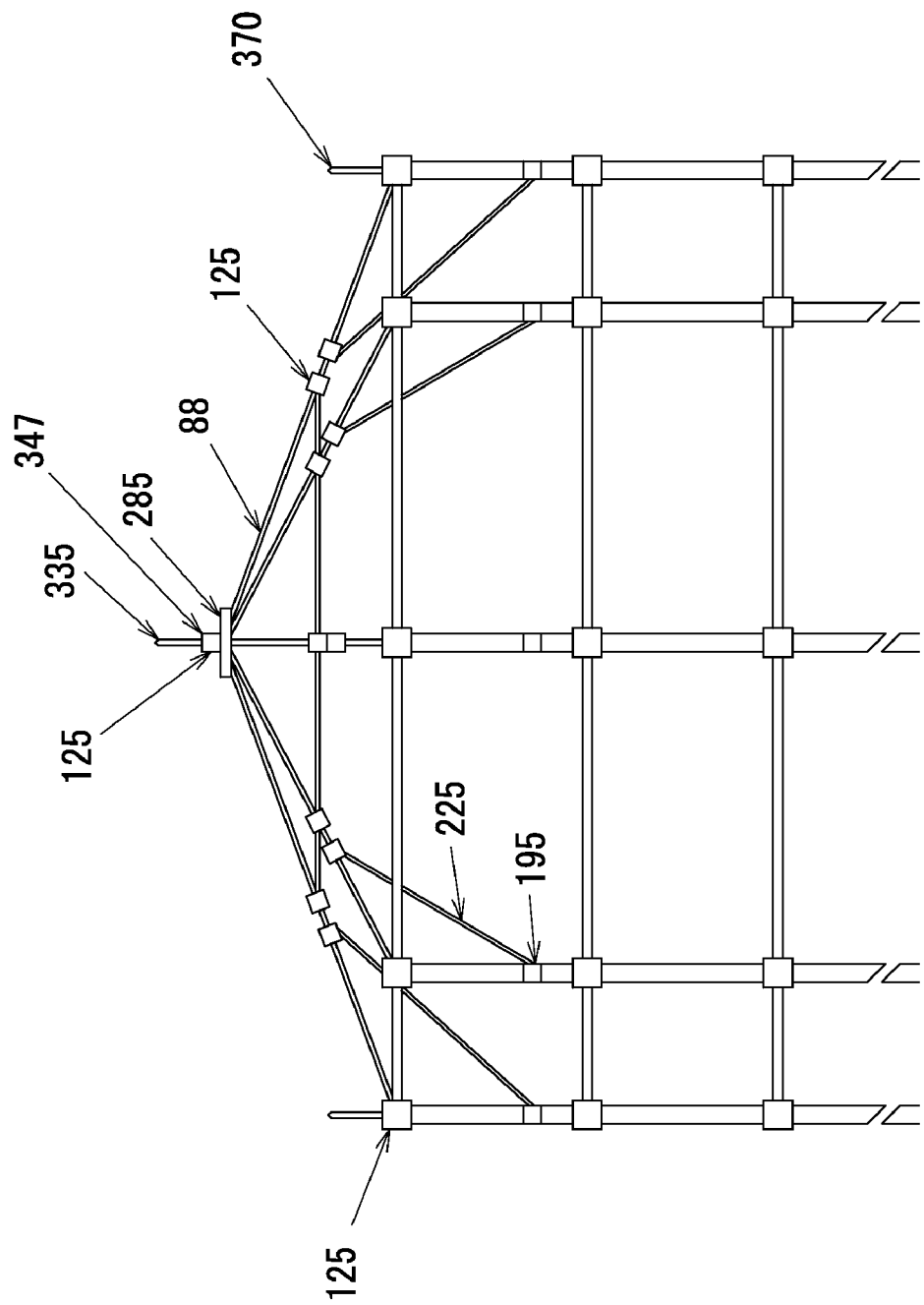

LIGHTNING PROTECTION SYSTEM AND METHOD

FIELD OF THE INVENTION

The present invention relates to a lightning protection system generally, and more specifically, to a customizable lightning protection system and method for erecting lightning protection equipment to protect a variety of structures, equipment, area, or zone of interest.

BACKGROUND

Recently, the world has witnessed extraordinary weather conditions, which may be the result of global warming. Lightning cloud scale is large compared with standard cloud types, and insulation provided by the atmosphere has been decreasing as humidity and rainfall have increased. Further, it is believed that lightning clouds are forming closer to the earth's surface resulting in the increased potential for lightning strikes. Additionally, as wind energy generating options become more commonly deployed, the possibility of lightning damage to these relatively sensitive structures increases.

A variety of lightning protection systems and equipment is known in the prior art. The objective in any successful lighting amelioration system is to provide a location for lightning to strike, and a preferred conductive path to safely dissipate current. For example, disclosure JP2005327581A, to Makoto, et al., entitled Lightning Rod Device, discloses, in part, a lightning rod device having a radial horizontal rod part, a ring-shaped rod part, and a radial slanted rod part surrounding a pillar. While the Makoto's device is easy to deploy, it does not appear particularly customizable. In addition, JP 2006164661A to Yuichi, discloses, in part, a Lightning Rod having an annular receiving part with radially disposed projecting needles on a lightning rod. Further, reference JP11040390A to Giichiro, discloses, in part, an Insulating Type Lightning Conductor, having an insulating pipe with a plurality of insulators integrally fixed to a lightning conductor supporting pipe, and other components. JP2006209984A to Makoto, et al, discloses, in part, a Lightning Rod Device having the capability to expand lightning-receiving range for a lightning strike by extending a pair of horizontally disposed rods centrally crossing and coupled to a ring-shaped rod. While Makoto does feature some ability to customize the apparatus, the options appear restricted to increasing the length of the horizontal rods and, by extension, the circumferential distance of the ring-shaped rod. JP5121192A to Shuzo, discloses, in part, a Lightning Rod with Ring, and similar to Yuichi, having a horizontal ring axially disposed around vertical bar-like conductor, having a conducting cone which increases the protection area with an overall shorter lightning rod. Reference JP8330093A, to Takashi, et al., discloses, in part, a Lightning Arrester Rod, having a lightning arrestor rod shaped like a tree branch and wired along a tree. Reference JP4249895A, to Nobuo, et al, discloses, in part, a Lightning Discharger and Outdoor Structure Equipped with the Device. This invention appears to be adaptable as an electrical receiving unit mounted to an outdoor structure (such as a sodium lamp) to protect the structure against lightning. This apparatus seems to be limited to mounting the conductor directly on the structure to be protected.

While the disclosed references may offer a degree of lightning protection, they are not particularly customizable to protect equipment or structure of varying size, shape, and location. What is needed is an apparatus having a relatively low impedance structure that serves to minimize structural damage or protect areas of interest by directing current from a direct strike as well as offer the option to provide management of lightning electromagnetic impulse (LEMP). What is further needed is a system that may be adapted to protect structure from a lightning stroke arising from variety of directions.

SUMMARY

The present invention discloses an omnidirectional, external, lightning protection system which may minimize or prevent damage from lightning current and lightning electromagnetic impulse (LEMP). Additionally, embodiments of the present invention may be rapidly erected to protect a structure or area, and may remain as a temporary, permanent, or semi-permanent protective structure. Further, it is anticipated that various components described herein may be deployed according to accepted methods of lightning protection, including the protective angle, rolling sphere, and mesh methods. Various embodiments of the present invention may provide protection from multidirectional strokes.

BRIEF DESCRIPTION OF THE DRAWINGS

FIG. 1 illustrates an end view of an embodiment prop brace.

FIG. 2 illustrates a side elevation view of an embodiment prop brace.

FIG. 3 illustrates an end view of an embodiment conductor pipe.

FIG. 4 illustrates a side elevation view of an embodiment conductor pipe.

FIG. 7 illustrates an end elevation view of an embodiment pipe for dissipation of an electromagnetic wave.

FIG. 8 illustrates a side elevation view of an embodiment conductor pipe adapted for dissipation of an electromagnetic wave.

FIG. 16 illustrates an end elevation view of an alternative reinforcing crosspiece.

FIG. 17 illustrates a side elevation view of an alternative embodiment reinforcing crosspiece.

FIG. 18 illustrates a bottom view of an alternative embodiment reinforcing crosspiece.

FIG. 41 illustrates an embodiment stopper cap.

FIG. 42 illustrates an embodiment connection coupler demonstrating different component attachments.

FIG. 43 illustrates an embodiment example air termination system with embodiment lightning rod stands and rods affixed to connection couplers.

FIG. 46 illustrates an example embodiment assembled structure having a substantially domed top surface.

FIG. 47 illustrates an example apparatus with an associated zone of protection.

FIG. 50 illustrates an embodiment multi angle assembly having a domed top surface.

DETAILED DESCRIPTION OF EMBODIMENTS OF THE INVENTION

Figure 6:
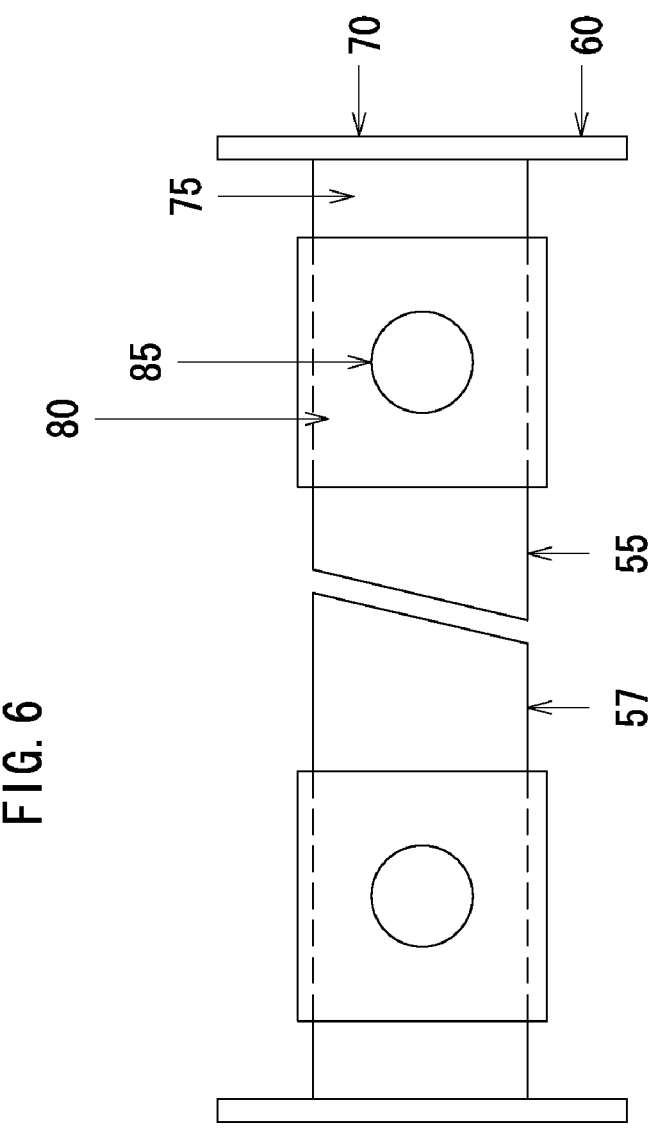
FIG. 6 illustrates a side elevation view of an embodiment prop brace adapted for dissipation of an electromagnetic wave.

Turning attention now to the several figures, in one embodiment illustrated by FIGS. 1 and 2, a prop brace 12 comprised of conductor pipe 10, and end plating 15 at either terminal end of pipe 10. End plating 15 has a series of peripheral coupling apertures 20 disposed substantially at the corners of plating 15 and has centrally disposed aperture 25. Aperture 25 corresponds with a channel 27 that runs the course of pipe 10. The structure may be constructed manually by inserting pipe 10 through aperture 25 and welding plating 15 such that it is affixed to pipe 10. Importantly, pipe 10 and plating 15 of prop brace 12 may be formed as an integral unit. Multiple prop brace 12 elements may be secured together to form a desired length. Prop brace 12 units may be affixed where a conventional nut-and-bolt assembly secures plating 15 through coupling aperture 20 of two or more adjoining prop brace 12 units.

FIGS. 3 and 4 illustrate grounded conductor pipe 32 comprised of pipe 30 affixed to end plating 35 at either terminal end of pipe 30. End plating 35 has a series of peripheral coupling apertures 40 which are disposed substantially at the centermost portion of end plating's 35 perimeter. Aperture 45 is centrally disposed in plating 35, and corresponds with channel 50 that runs the course of pipe 30. Conductor pipes 10 and/or 30, may be grounded by an overhead ground wire. Conductor pipe 32 may be constructed and affixed in the same manner as prop brace 12 described above.

Figure 5:
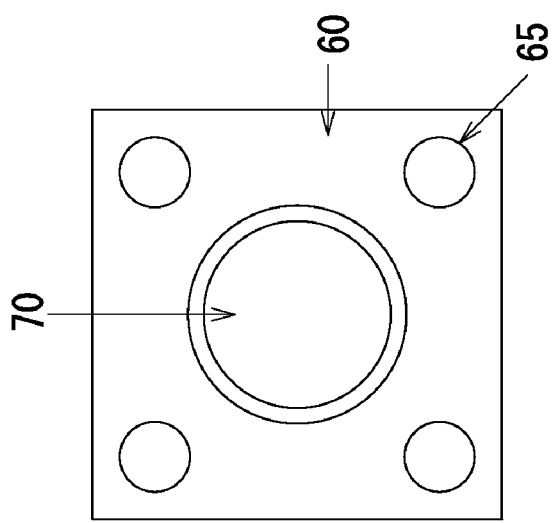
FIG. 5 illustrates an end view of an embodiment prop brace adapted to prevent propagation of an electromagnetic wave.

FIGS. 5 and 6 illustrate a prop brace 57 comprised of pipe 55 coupled to end plating 60 which prevents propagation of an electromagnetic wave. Prop brace 57 has end plating 60 at either terminal end of pipe 55. End plating 60 has a series of peripheral coupling apertures 65 which are disposed substantially at the corners of end plating 60. Aperture 70 is centrally disposed in plating 60 and corresponds with channel 75 that runs the course of brace 57. At least one cross coupling 80 is disposed on pipe 55 and has aperture 85; the radius of which being perpendicular to the radius of aperture 70. Aperture 85 rests over an aperture in pipe 55 which accesses the hollow length of pipe 55. Prop brace 57 may be constructed and affixed in the same manner as prop brace 12 described above. Wiring, including copper-clad steel, wiring is contained within the hollow aspect of prop brace 57 and may pass through aperture 85.

FIGS. 7 and 8 illustrate conductor assembly 88 for dissipation of electromagnetic wave. Pipe 90 has end plating 95 at either terminal end of pipe 90. End plating 95 has a series of peripheral coupling apertures 100 which are disposed substantially at the centermost portion of end plating 95's perimeter. Aperture 105 is centrally disposed in plating 95 and corresponds with channel 110 that runs the course of pipe 90. At least one cross coupling 115 is disposed on pipe 90 and has aperture 120; the radius of which being perpendicular to the radius of aperture 105. Wiring, including copper-clad steel, wiring is contained within the hollow aspect of prop brace 88 and may pass through aperture 120.

It should be noted that FIGS. 1-8 illustrate different aspects of the conductor elements including prop brace 12, grounded conductor pipe 32, prop brace 57, and conductor assembly 88. Each component can be considered to have a first end and second end which is arbitrary from a structural standpoint: the designation of first and second end may be utilized as an aid to assist in assembly.

Figure 9:
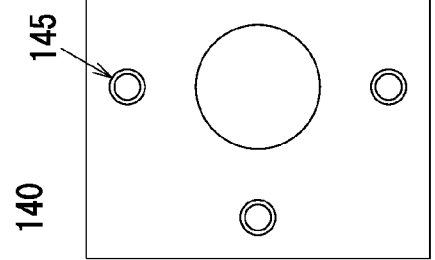
FIG. 9 illustrates an elevation view of a first surface of an embodiment connection coupler.
Figure 10:
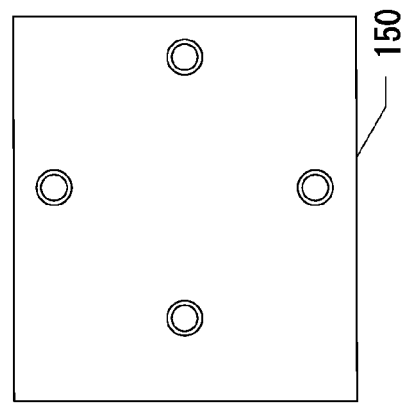
FIG. 10 illustrates an elevation view of a second surface of an embodiment connection coupler.
Figure 11:
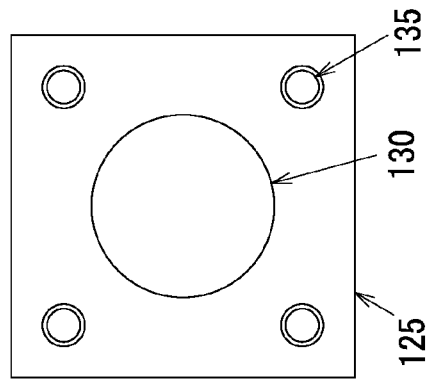
FIG. 11 illustrates an elevation view of a third surface of an embodiment connection coupler.
Figure 12:
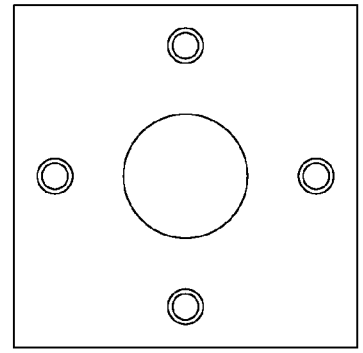
FIG. 12 illustrates an elevation view of a fourth surface of an embodiment connection coupler.

FIGS. 9-12 illustrate an embodiment cube-shaped conductor connection coupler 125 having six faces. FIG. 9 illustrates the front view of coupler 125 which has a central aperture 130 and a series of peripheral coupling apertures 135 which are disposed substantially at the corners of coupler 125. Specifically, FIG. 10 illustrates a side view with a second coupling aperture 140 and series of peripheral coupling apertures 145 which are disposed substantially at the centermost portion of coupler 125's perimeter. FIG. 11 illustrates the top surface 150 of coupler 125, further illustrating coupling apertures which are disposed substantially at the centermost portion of coupler 125's perimeter. Connection coupler 125 is cube shaped and permits connection on six surfaces to couple with other components of the present invention.

Figure 14:
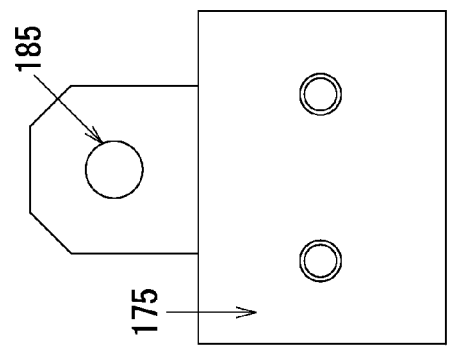
FIG. 14 illustrates a side elevation view of a fitting for a reinforcing crosspiece.
Figure 13:
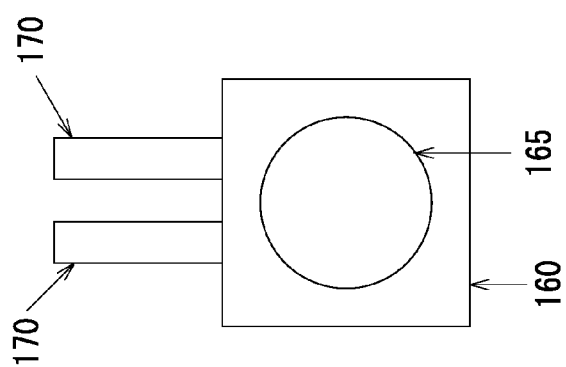
FIG. 13 illustrates an end elevation view of an embodiment fitting for reinforcing crosspiece.
Figure 15:
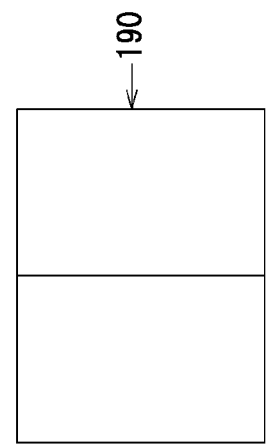
FIG. 15 illustrates a bottom view of a fitting for a reinforcing crosspiece.

FIGS. 13-15 illustrate an embodiment fitting for reinforcing crosspiece fitting 160. FIG. 13 illustrates the front view of fitting 160 showing aperture 165, and coupling bracketing 170. FIG. 14 illustrates the side 175 of crosspiece 160 illustrating mounting aperture 180 and bracket aperture 185. FIG. 15 illustrates the bottom 190 of fitting 160.

FIGS. 16-18 illustrate an embodiment fitting for reinforcing crosspiece 195. FIG. 16 illustrates the front view of fitting 195 showing coupling bracketing 200. FIG. 17 illustrates the side 205 of fitting 195, having aperture 210 in bracketing 200. FIG. 18 illustrates the bottom 215 of fitting 195 with a series of coupling apertures 220 along the periphery.

Figure 20:
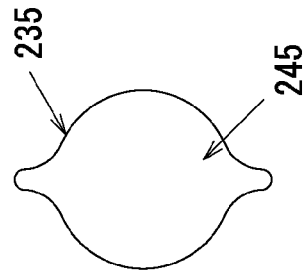
FIG. 20 illustrates a top view of a reinforcing crosspiece.
Figure 19:
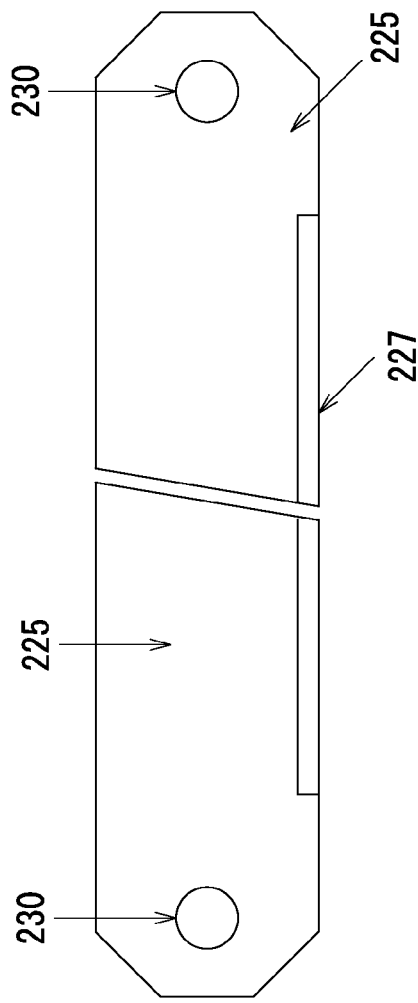
FIG. 19 illustrates a side elevation view of a reinforcing crosspiece.

FIGS. 19-20 illustrate reinforcing crosspiece 225. FIG. 19 illustrates a side view of crosspiece 225 having reinforcement strip 227 along the relative bottom. Aperture 230 is located at either end of crosspiece 225. FIG. 20 illustrates the top view of crosspiece 225.

Figure 22:
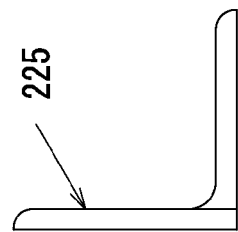
FIG. 22 illustrates an end view of an alternative embodiment reinforcing crosspiece.
Figure 21:
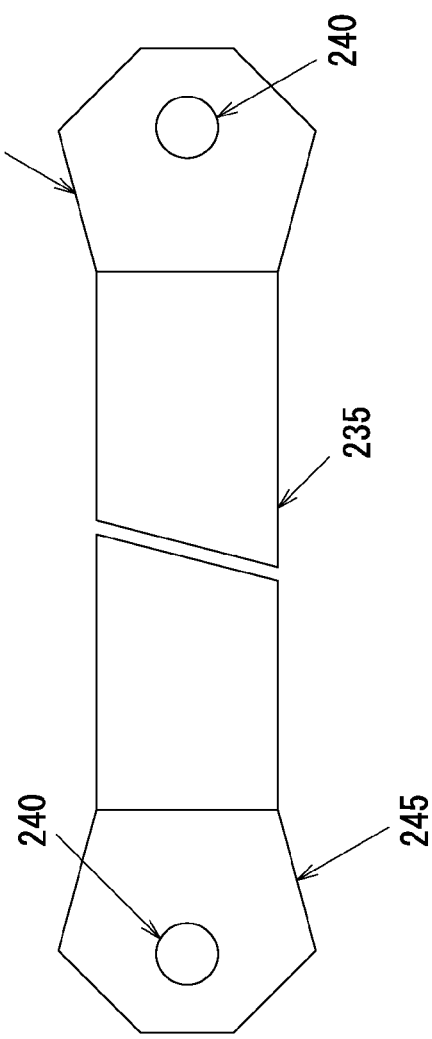
FIG. 21 illustrates a side view of an alternative embodiment reinforcing crosspiece.

FIGS. 21-22 illustrate reinforcing crosspiece 235. FIG. 21 illustrates a side view of crosspiece 235 terminates in tapered engagement surface 245, the tapered portion having aperture 240 located therethrough.

Figure 24:
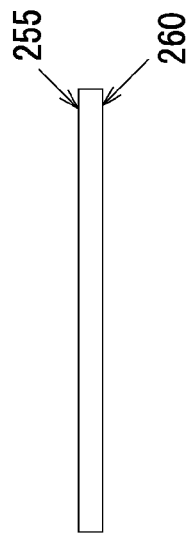
FIG. 24 illustrates a side elevation view of a connection board.
Figure 23:
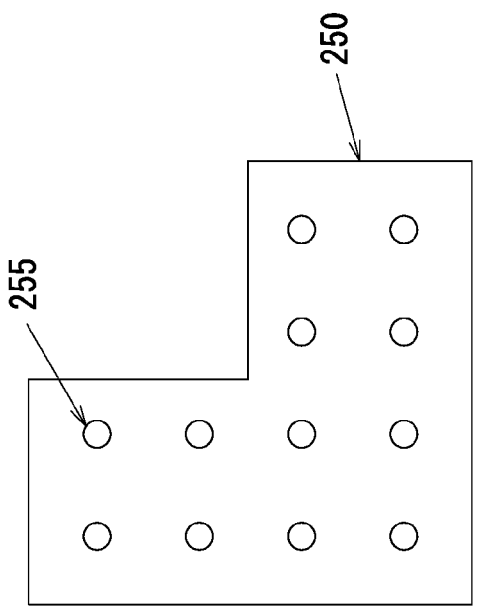
FIG. 23 illustrates a top view of a connection board.

FIG. 23-24 illustrate connection board 250 which is a substantially symmetrical L shaped planar surface and has a plurality of coupling apertures 255 passing therethrough. The two aspects of the symmetrical L-shaped surface lie 90 degrees apart. FIG. 24 illustrates the side view 260 of board 250.

Figure 26:
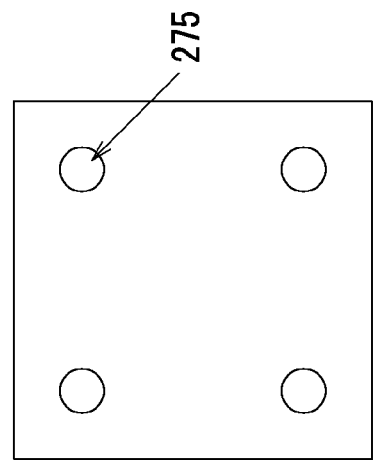
FIG. 26 illustrates a bottom view of an angled coupler.
Figure 25:
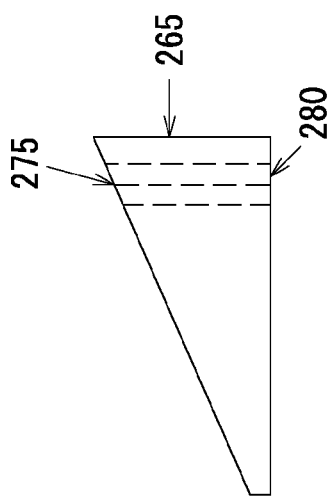
FIG. 25 illustrates a side elevation view of an angled coupler.

FIGS. 25-26 illustrate angled coupler 265. FIG. 25 is a side view of coupler 265 illustrating an incline. FIG. 26 illustrates the bottom 275 of coupler 265 showing coupling apertures 275 passing therethrough. Channels 280 passing through coupler 265 corresponding to apertures 275 are demonstrated on FIG. 25.

Figure 28:
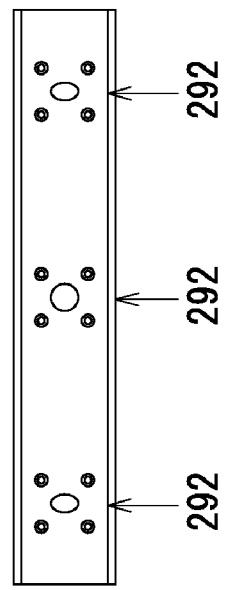
FIG. 28 illustrates a side elevation view of an embodiment intensive connection coupler.
Figure 27:
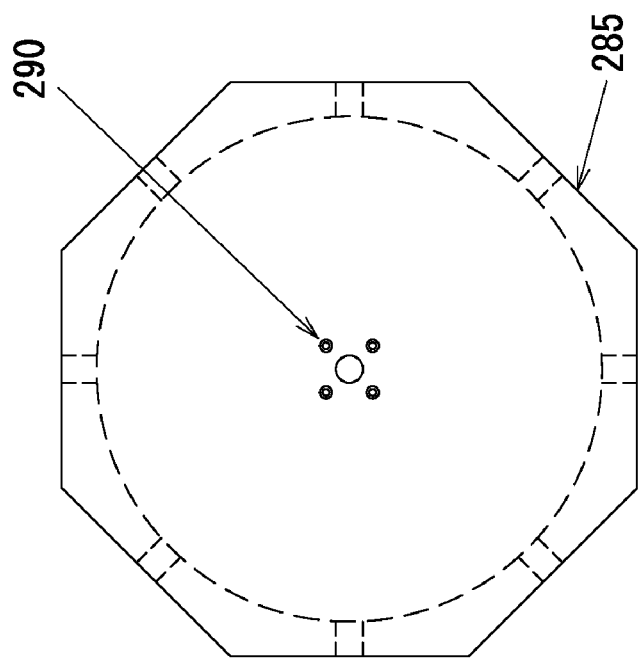
FIG. 27 illustrates a top view of an embodiment intensive connection coupler.

FIGS. 27-28 illustrate an embodiment intensive connection coupler that is an octagonally shaped intensive connection coupler 285. Coupler 285 has a central coupling point 290 comprised of a series of four small coupling apertures and a central aperture. Peripheral coupling points 292 are centrally located on each lateral surface of octagonal coupler 285 as illustrated by FIG. 28.

Figure 29:
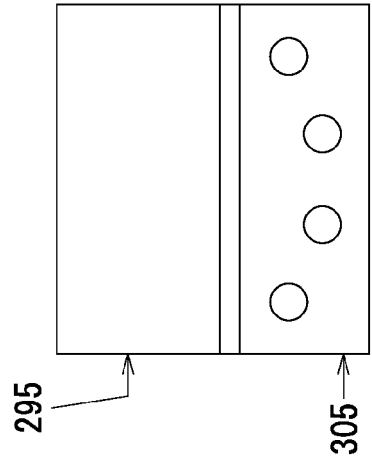
FIG. 29 illustrates an end elevation view of an embodiment prop brace coupler.
Figure 30:
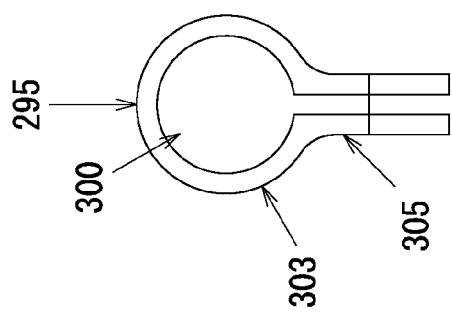
FIG. 30 illustrates a side elevation view of an embodiment prop brace coupler.
Figure 31:
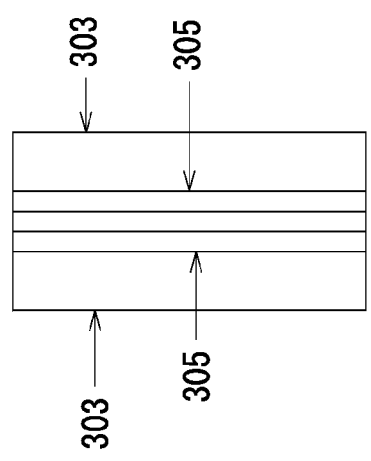
FIG. 31 illustrates a bottom view of an embodiment prop brace coupler.

FIGS. 29-31 illustrate prop brace coupler 295. FIG. 29 illustrates a front view of brace coupler 295 demonstrates an annularly shaped portion 303 to form void 300 and forms two opposing brace elements 305. FIG. 30 illustrates a plurality of coupling apertures in brace elements 305. FIG. 31 illustrates a bottom view of brace elements 305 and annular shaped portion 303.

Figure 33:
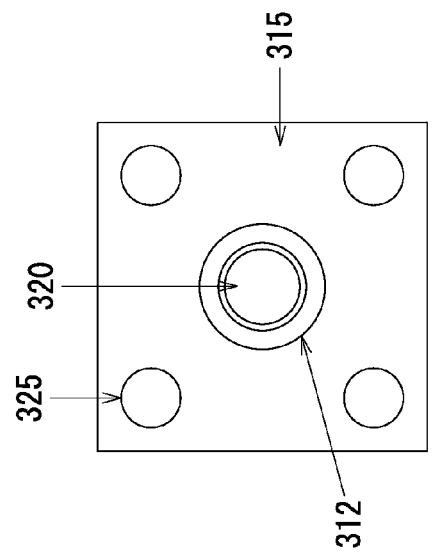
FIG. 33 illustrates a top view of an embodiment fitting stand for a lightning rod.
Figure 35:
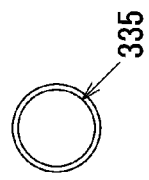
FIG. 35 illustrates a top view of an embodiment lightning rod.
Figure 32:
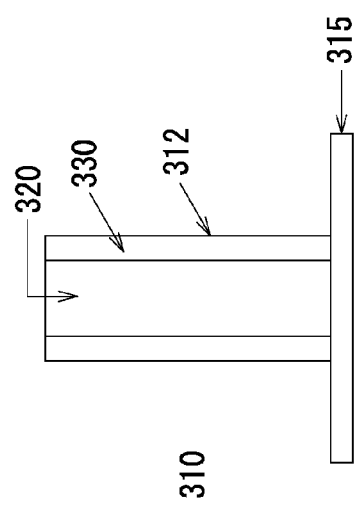
FIG. 32 illustrates a side cross-sectional view of an embodiment fitting stand.
Figure 34:
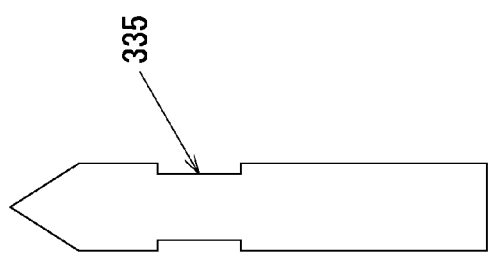
FIG. 34 illustrates a side view of an embodiment lightning rod.

FIGS. 32-33 illustrate lightning rod fitting stand 310 having base 315 and a column 312, the column having an internal void 320 to accommodate a lightning rod. FIG. 33 illustrates a top view of stand 310 illustrating void 320 and mounting apertures 325 located substantially at the corners of base 315. Screw 330 may be tightened to secure lightning rod 335. FIGS. 34-35 illustrate lightning rod 335 which may be slidably disposed within base 315. Screw 330 may be tightened to secure rod 335 in base 315. FIGS. 34-35 illustrate lightning rod 335.

Figure 37:
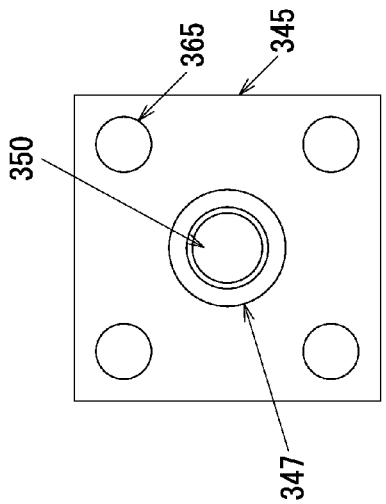
FIG. 37 illustrates a bottom view of an alternative embodiment lightning rod stand.
Figure 36:
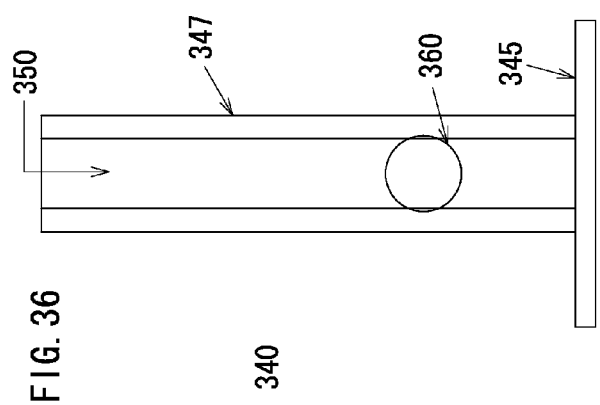
FIG. 36 illustrates a side cross-sectional view of an alternative embodiment lightning rod stand.

FIGS. 36-37 illustrate a fitting stand for lightning rod adapted to ameliorate an electromagnetic impulse. FIG. 36 illustrates stand 340 having base 345 and a column 347, the column having an internal void 350. Column 347 has wiring aperture 360 the radius of which is perpendicular to base 345. Base 345 has coupling apertures 365 to permit affixation on other components.

Figure 40:
FIG. 40 illustrates a top view of an embodiment lightning rod.
Figure 39:
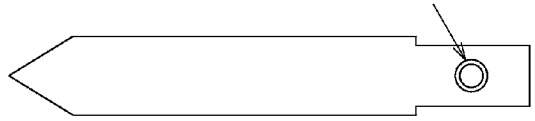
FIG. 39 illustrates front view of an embodiment lightning rod.
Figure 38:
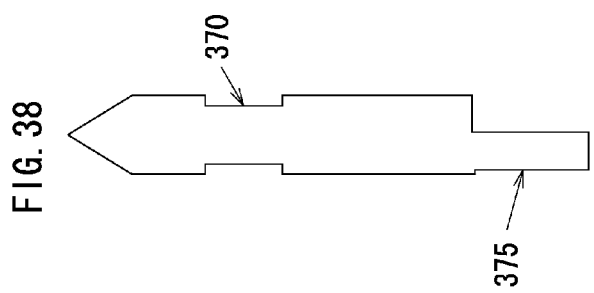
FIG. 38 illustrates a side view of an embodiment lightning rod.

FIGS. 38-40 illustrate lightning rod 370 adapted to attenuate an electromagnetic impulse. Rod 370 has wiring channel 375 which corresponds to aperture 360 of stand 340. Lightning rod 370 may be slidably disposed within stand 340 and secured by screw 355. To disrupt damaging electromagnetic wave propagation, the present invention, the down conductor is comprised of copper conductor wires. Rod 370 is adapted to dissipate lightning electromagnetic pulse (LEMP). Example rod 370, fitted in stand 340, is connected with copper clad wires through stand aperture 360 to channel 375 of rod 370. Copper clad wiring may be routed through hollow components of the invention including, as examples, prop brace 57 and conductor pipe 88. The structural components comprising the down conductor system may function to dissipate LEMP. As shown by FIG. 41, lid 375 may be inserted into the hollow of the apparatus after wiring is completed. FIG. 41 illustrates a rubber lid 375 having a dual rubber stopper top 380 mounted on a stopper mounted on cylindrical plug stop 385.

FIG. 42 illustrates an example of various attachments to conduction connection coupler 125. Conduction connection coupler 125 may be coupled to a variety of other components to build the desired structure. Coupler 125 may be connected to angled coupler 265, which may be coupled to stand 310 which accommodates rod 335. Brace 32 may be coupled directly to connection coupler 125. The varied attachments of the present invention provides a wide degree of flexibility in constructing protective apparatus. Of course, it should be recognized that FIG. 42 is intended to provide a sense of how coupler 125 may be attached: any coupling sequence may be followed using any of the herein described inventive lightning protective assembly components. For example, angled couplers 265 may be omitted, and stand 340 attached directly to coupler 125. Angled coupler 265 may be coupled to crosspiece 160.

FIG. 43 illustrates an example of various types of air termination embodiments wherein lightning rod 370 is inserted into stand 340 and coupled to a surface of connection coupler 125. Alternatively, rod 335 may be inserted into stand 310 which may be coupled to connection coupler 125. Prop brace 12 or prop brace for electromagnetic wave 57 may be coupled to connection coupler 125 on surface 400. This arrangement permits a variety of rods 335/370 to be utilized and coupled together and any variety of grounded conductor pipe 32 and/or conductor assembly 88 in any combination and configuration to provide protection to the desired area.

Regarding the system generally, the structural components described herein are comprised of conductive metal and can be arranged in lattice or multi-angled framework. It should be noted, however, that other materials that have electrical conductive properties may be utilized. One alternative example utilizes amorphous metal which offers the advantages of being light weight and relatively corrosion resistant in addition to having a low cross-sectional resistance value.

Figure 44:
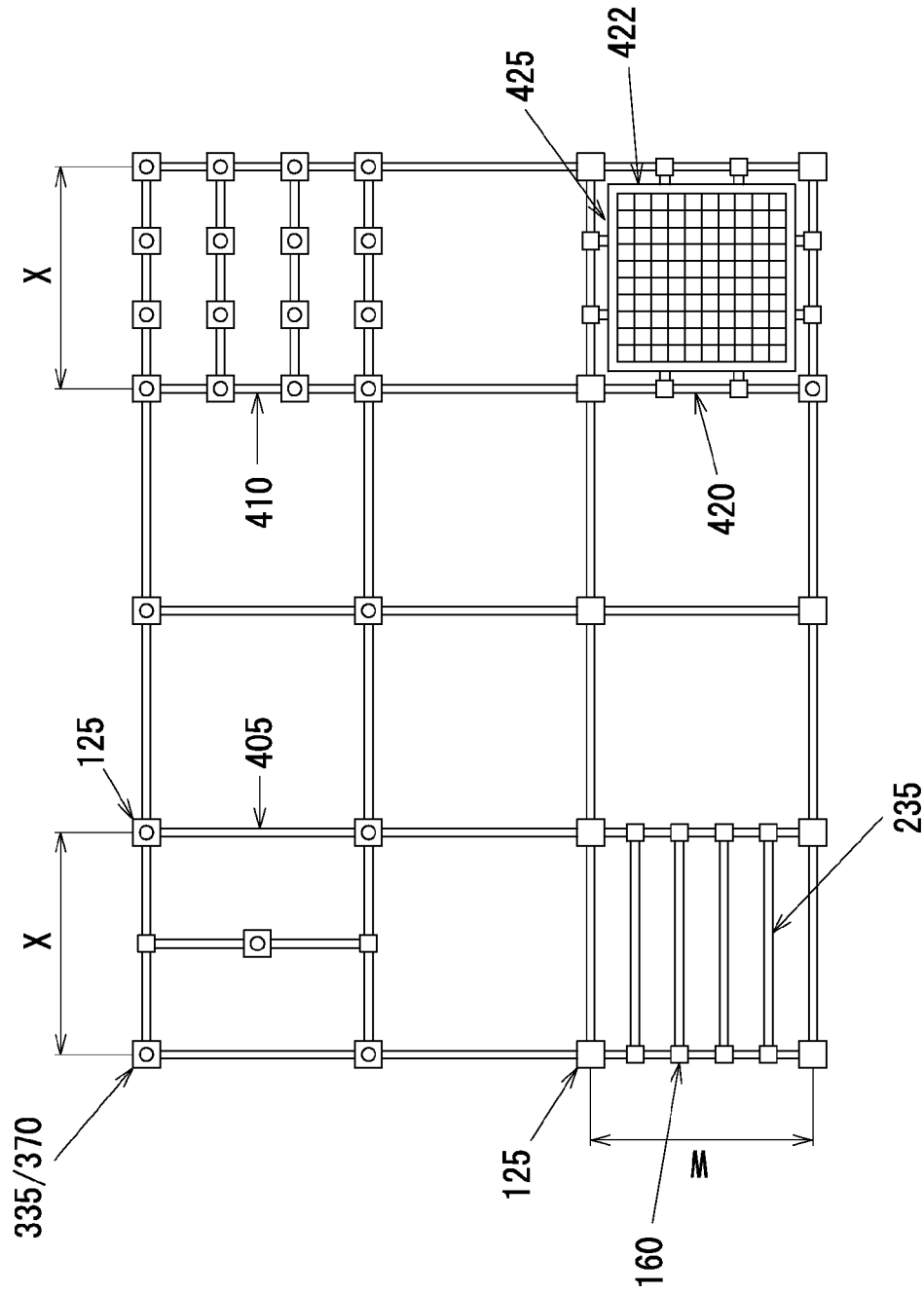
FIG. 44 illustrates an example of various air termination systems and coupling mechanisms.

FIG. 44 illustrates various examples of air termination systems utilizable with the present invention. Further, the components may be constructed in a standard size and are relatively small thus making the stem components portable. The system, therefore, may be planned and assembled in a relatively short period of time without requiring formal construction. For example, FIG. 44, illustrates an example air termination system 405 where rods 335/370 may be affixed to connection coupler 125 and cross-linked with grounded conductor pipe 32/88. In another example air termination system 410, a number of lightning rods are deployed and arranged so as to maximally protect an important zones. Yet another example air termination system 415 has a square structure framed by conductor pipe 32/88 on four sides, each coupled to connection coupler 125 at the corners. Across the center of the square, a plurality of parallel reinforcing crosspiece 235 members are secured by reinforcing crosspiece fitting 160. In one embodiment, the distance between crosspieces 235 and conductor pipe 32/88 is denoted by W. In one embodiment, a useful distance W may be 0.05-12 meters. As another embodiment 420 includes a square 425 which may be comprised as described above, or by any assembly providing a square or rectangle. In another embodiment, a centrally disposed mesh grate 422 is coupled to fittings 160; in one embodiment, the mesh grating is 0.5 meters$^2$-1.5 meters.$^2$ The size of the mesh depends on the desired degree of lightning protection. Standards well known in the art, provide various lightning protection classifications. With regard to mesh, size may include 5 meters$^2$ (corresponding to class I); 10 meters$^2$ (corresponding to Class II) 15 meters$^2$ (corresponding to class III), and 20 meters$^2$ (corresponding to class IV) as adopted by the International Electrotechnical Commission and the British Standard on lightning protection.

Figure 45:
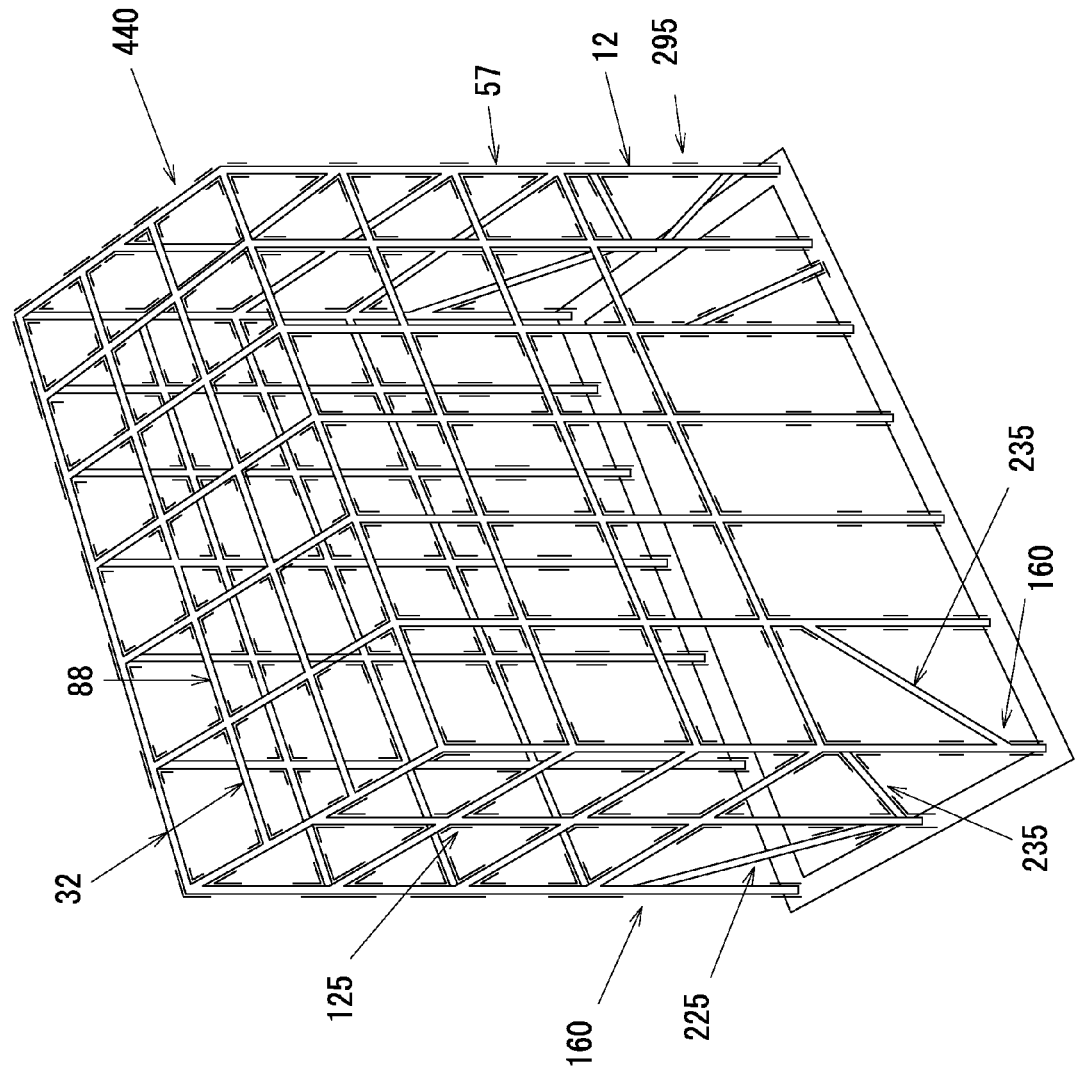
FIG. 45 illustrates an example embodiment assembled structure having a planar top surface.

FIG. 45 illustrates a rodless embodiment assembled to form an incomplete rectangular apparatus assembly 440. The assembled structure has base/earth termination system 430 which is coupled to a plurality of prop braces 12 or prop brace for electromagnetic wave 57. Optionally prop brace coupler 295 is coupled to prop braces 12 (or prop braces for electromagnetic wave 57) to provide the necessary structural length. Where necessary, reinforced crosspiece 235 and/or crosspiece 225 is coupled to fitting 160 and utilized to provide support. Connection coupler 125 provides a coupling point for a variety of structures including prop brace 12, conductor pipe 88, prop brace for electromagnetic wave 57 and/or conductor pipe 32.

FIG. 46 illustrates an domed surface assembly 450 having either rod 334 or electromagnetic rod 370 coupled to connection coupler 125 which is itself coupled to prop brace 12 or prop brace 57. Where needed, prop brace coupler 295 is utilized to couple to prop braces 12 (or 57). Angled connection coupler 265 is coupled to connection coupler 125 on one end and reinforcing crosspiece 235 on the other. This arrangement permits cross pieces to be angled to conform the structure as desired.

Turning to FIG. 47, a lightning protection zone, D, is established by taking into account the height of the structure to be protected and the height and location of the collector rods according to the well known LPS methods—including the protective angle method. In one embodiment example of system 410 utilizing the protective angle method, the space between rods 335/370 is 0.5-25 meters in one direction (represented by X), and 0.5-25 meters in a perpendicular direction (represented by Y) with the apparatus height being 1-25 meters. A zone of protection Q having a diameter D is formed around each rod 335/370. Rod 370 is inserted in stand 347 with stand being coupled to connection coupler 125. Of course, alternatively, rod 335 is inserted in stand 335 and coupled to connection coupler 125. Connection pipe 88 is coupled, at each end, to connection coupler 125 (which is underneath stand 335 from this angle and therefore not shown).

Figure 49:
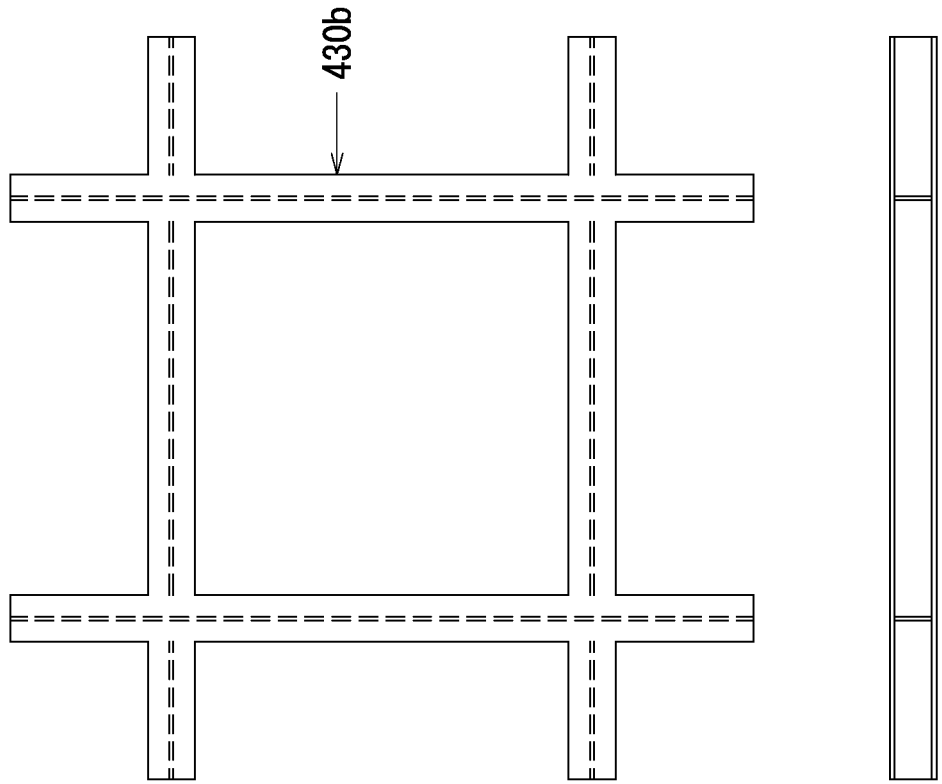
FIG. 49 illustrates an example embodiment earth termination system base.
Figure 48:
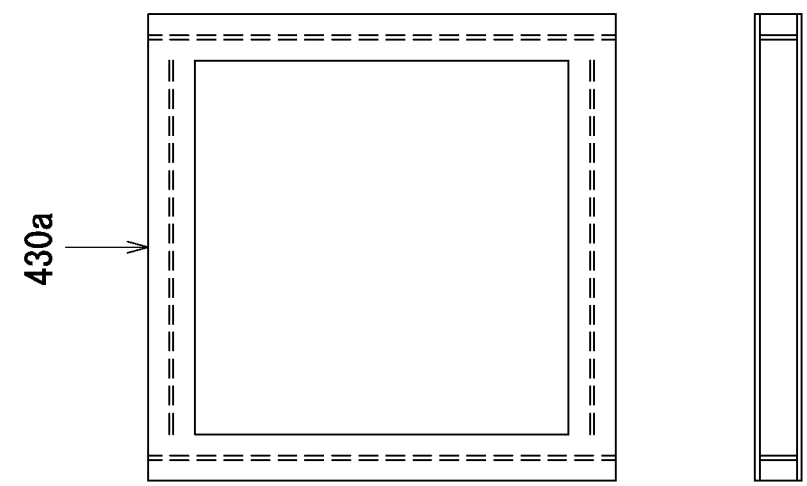
FIG. 48 illustrates an example embodiment earth termination system base.

FIGS. 48 and 49 illustrate embodiment earth termination systems 430 which may function as a base upon which to set assembled structure. Earth termination system base 430a comprises a square frame, and termination system 430b comprises an extended frame. Both systems may be anchored into the ground and may be fixed by concrete or stake. In one embodiment the termination system is comprised of steel and may be embedded in the earth. Other aspects of the LPS assembly may be constructed on the upper surface of the base termination system 430. The size of the base termination system will vary and depend on the size of the assembled structure as well as the size of the area, structure, or equipment to be protected. It should be noted that the earth termination system generally comprises a conductive material electrically coupled to at least one conductive element. The conductive material forming the earth termination system may be anchored to or buried within the earth soil.

FIG. 50 illustrates an embodiment multi-angle assembly. An example rod 335 is inserted in stand 347 which is coupled to connection coupler 125. Coupler 125 is coupled to intensive connection coupler 285. Conduction pipe 88 is coupled to intensive coupler 285 at one end and connection coupler 125 at the other end. Where needed, reinforcing crosspieces 225 may be coupled to connection coupler 125 at one end and fitting stand 195. Importantly, angled connection coupler may be coupled to any structure to change the angle as desired.

It should be noted that the size of constructed apparatus is customized to the space to be protected. The base termination system 430 may be enlarged as necessary, to provide adequate horizontal structure, and the number of prop braces 12 and rod may be added to provide the desired vertical height. In one embodiment, each apparatus component of a given type (e.g. prop brace 12) may be standardized to be of a given size. This will facilitate planning as simple measurements of a given structure can be utilized to determine the precise equipment required to protect the area. This uniform sized embodiment of components may also streamline ordering, and provide the supplier the ability to not only provide the required apparatus structure, but also assembly directions tailored to the particular structure, building, or space to be protected.

Regarding composition of apparatus components, the present invention may be comprised of any conductive structure. Common steel, carbon steel, stainless steel, copper, and iron may be utilized in creating the structural components. Wire utilized in the present invention may be comprised of any material sufficient to handle anticipated LEMP current, and copper and iron wiring may be used.

Where a large zone of protection is required, a large plurality of components may be used to cover the required area, and, inter alia, distribute the weight of a planar top surface of an assembled structure (if utilized). Further, in certain embodiments, the size of certain classes of components (e.g. prop braces) may differ to permit convex or concave design of an assembled top planar surface.

Turning now to assembly, base 430 illustrated by FIGS. 48 and 49, may be boltably or screwably affix to component members (such as prop brace 12, or conductor pipe 88) to be perpendicular to base 430. Connection coupler 125 may be coupled to the opposite end of the component member. Other components may then be added on the connection coupler 125 (e.g. coupler 195 on FIG. 16 and thereafter crosspiece 225 on FIG. 19) to achieve the desired structural apparatus size and shape.

Aspects of the present invention permit the attenuation of the lighting electromagnetic impulse (LEMP). In one embodiment, rods 335/370 may be electrically coupled to conductor wiring (such as copper clad steel wiring), and contained within the internal void of the certain components having such a void (e.g. prop brace 12 or conductor pipe 32). The conductor wiring is contained within the down conductor system and electrically coupled to the earth termination system, wherein lightning stroke current is discharged to the ground. Further, in certain embodiments, to dissipate LEMP, the air termination system may be assembled and deployed adjacent to the area or structure to be protected.

An embodiment for the protection against electromagnetic impulse is disclosed. In one embodiment, the protective angle method is utilized to place a plurality of rods arranged so as to make lighting flash to lightning rods. Rods are connected with conductor wire (which may be copper clad steel wire). During a lightning strike event, current flows through the metal conductive structures (e.g. prop brace 57, and conductor assembly 88) and generates induced current. Wiring contained within the void of prop brace 57 and conductor assembly 88 and coupled to an earth termination system discharges the residual induced current and thereby attenuates the electromagnetic impulse. And by attenuating the electromagnetic wave in this manner, this omnidirectional lightning rod system can be erected adjacent to a structure to be protected.

The given components of the present inventive system each has a cross sectional resistance. Based upon the cross-sectional resistance of the components, an aggregate resistance value for the apparatus can be calculated and, if desired, confirmed by testing before the structure is deployed.

The inventive lightning protection system including the customizable air termination system may be used to protect structures using the protective angle method, mesh method, and rolling sphere method (associated to an electrogeometric model). The structure will be adopted to confirm to accepted standards of applying air termination systems using accepted protection methods and the desired class of lightning protection. The present inventive apparatus may be conformed to various prevailing standards including but not limited to those promulgated by: Underwriters Laboratories, Inc., National Fire Protection Association, Lightning Protection Institute, and the International Electrotechnical Commission.

The present invention further discloses a method of protecting a given area, structure, or equipment—a zone of protection. The method for establishing lightning protection for a given area, structure, or equipment includes: selecting the target desired zone of protection, and determining the required level of protection. The required level of protection depends on the sensitivity of the materials, structure, apparatus, or area to be protected. Various Lightning Protection Levels (LPL)s are well known to artisans in the field, and one particular standard utilizes four levels of lightning protection (LPL I to IV). The desired protection technique is next selected. As discussed above, there are several techniques which are well described in both their theoretical underpinnings as well as methodology for determining deployment of lightning protective resources. These methods are the Protective Angle Method, the Rolling Sphere Method, and the Mesh Method. Other methods such as the Collection Volume Method have been proposed. Interception models continue to be studied and refined. Using one or more of the above techniques, one calculates the lightning protective system structural requirements based upon the established principles of the given techniques. One may then assemble the present inventive apparatus as more fully described above to conform to the calculated lightning protective system structural requirements. The various components of the present invention are then assembled by coupling the required structure to cover the zone of interest. Importantly, the inventive system provides a plurality of components which permits for flexibility in constructing the apparatus. For example, elements including prop brace 12, grounded conductor pipe 32, prop brace 57, and conductor assembly 88, may be coupled end on end to meet until the required height is reached. Angled coupler 280 illustrated by FIGS. 25-26 and board 250 can be used as frequently as required to conform the geometric pattern of the structure to cover the zone of interest.

Although the present invention has been described with reference to the preferred embodiments, it should be understood that various modifications and variations can be easily made by those skilled in the art without departing from the scope and spirit of the invention. Accordingly, the foregoing disclosure should be interpreted as illustrative only and is not to be interpreted in a limiting sense. It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

What is claimed is:

1. An omnidirectional lightning protection system comprising:
    a plurality of conductive elements having a first end and second end;
    a cube shaped coupler, wherein said cube shaped coupler has six faces, wherein one of the plurality of said conductive element may be attached to the first end or second end of said cube shaped coupler;
    a reinforcing crosspiece stand which may be coupled to the first end or second end of said cube shaped coupler;
    at least one reinforcing crosspiece having a first end and second end, wherein said reinforcing crosspiece may be coupled to said reinforcing crosspiece stand;
    a planar connection board having a series of coupling apertures which is capable of being attached to the first or second end of said conductive elements or the first or second end of said reinforcing crosspiece;
    an angled coupler having coupling apertures, said angled coupler being capable of being attachment to the first or second end of said conductive elements or the first or second end of said reinforcing crosspiece;
    a conductive material electrically coupled to at least one conductive element, wherein said conductive material may be anchored to or buried within the earth soil, wherein said conductive material functions as an earth termination system.

2. The lightning protection system as recited in claim 1, further comprising a lightning rod fitting stand capable of being coupled to one surface of said cube shaped coupler.

3. The lightning protection system as recited in claim 2, further comprising a lightning rod capable of being inserted within and secured to said lightning rod fitting stand.

4. The lightning protection system as recited in claim 3, wherein said lightning rod fitting stand has a wiring aperture and wherein said lightning rod has a wiring aperture.

5. The lightning protection system as recited in claim 1, further comprising an intensive connection coupler capable of coupling to said angled coupler or first or second end of said conductive element or the first or second end of said reinforcing crosspiece.

6. The lightning protection system as recited in claim 1, further comprising a mesh grate coupled to said fitting stand for reinforcing crosspiece, wherein said reinforcing crosspiece stand is coupled to said conductive element.

7. The lightning protection system as recited in claim 1, further comprising a copper-clad steel wiring, wherein said conductive elements comprise a hollow pipe having at least one aperture along the length of said hollow pipe, wherein said copper-clad steel wiring rests within said hollow pipe, said copper-clad steel wiring being electrically coupled to said earth termination system, wherein induced current generated from current flowing through said conductive elements following a lightning strike, is discharged through said copper-clad steel wiring to said earth termination system.

\* \* \* \* \*